United States Patent [19]

Scherzer et al.

[11] Patent Number: 5,591,778

[45] Date of Patent: Jan. 7, 1997

[54] PROCESS FOR THE PREPARATION OF EXPANDABLE POLYSTYRENE

[75] Inventors: Dietrich Scherzer, Neustadt; Klaus Hahn, Kirchheim, both of Germany; Anthony Schaefer, Hightstown, N.J.; Bernhard Schmied, Frankenthal, Germany

[73] Assignee: BASF Aktiengesellschaft, Germany

[21] Appl. No.: 514,643

[22] Filed: Aug. 14, 1995

[51] Int. Cl.⁶ .................. C08J 9/18; C08J 9/20
[52] U.S. Cl. .................. 521/56; 521/59; 521/60
[58] Field of Search .................. 521/56, 59, 60

[56] References Cited

U.S. PATENT DOCUMENTS

| | | | |
|---|---|---|---|
| 4,520,135 | 5/1985 | Hahn et al. | 521/56 |
| 5,011,863 | 4/1991 | Godfrin | 521/56 |
| 5,071,882 | 12/1991 | Godfrin | 521/56 |
| 5,104,903 | 4/1992 | Hahn et al. | 521/60 |
| 5,118,718 | 6/1992 | Walter et al. | 521/60 |
| 5,173,514 | 12/1992 | Hahn et al. | 521/60 |
| 5,177,115 | 1/1993 | Hintz et al. | 521/60 |
| 5,262,445 | 11/1993 | Hahn et al. | 521/60 |
| 5,266,603 | 11/1993 | Holzmeler | 521/56 |
| 5,269,987 | 12/1993 | Reedy et al. | 521/79 |
| 5,290,819 | 3/1994 | Witt et al. | 521/60 |

*Primary Examiner*—Morton Foelak
*Attorney, Agent, or Firm*—Mary E. Golota

[57] ABSTRACT

The invention relates to a process for the preparation of bead shaped, expandable polystyrene by the polymerization of styrene in an aqueous suspension in the presence of dimeric α-methylstyrene as a regulator and a $C_3$ to $C_6$ hydrocarbon as a blowing agent, whereby one first reports the content of saturated hydrocarbons, having a boiling point between 70° and 170° C., in the styrene and dimeric α-methylstyrene, and then enough saturated hydrocarbons, having a boiling point from 70° to 170° C., are added before, during or after the polymerization so that their total content in the suspension is from 0.1 to 0.8 weight percent, based on the styrene.

1 Claim, No Drawings

PROCESS FOR THE PREPARATION OF EXPANDABLE POLYSTYRENE

The invention relates to a process for the preparation of bead shaped, expandable polystyrene by the polymerization of styrene in an aqueous suspension in the presence of blowing agents, auxiliary blowing agents and molecular weight regulators.

Foams based on styrene polymers have been known for some time and are well described in the literature. Of special significance here, are the so-called polystyrene particle foams which are prepared by foaming polystyrene particles containing blowing agent, and subsequently fusing these foamed particles into blocks, molded articles and other foamed objects.

The preparation of expandable polystyrene particles containing blowing agent generally occurs via suspension polymerization. Here, monomeric styrene is suspended in an aqueous solution and polymerized. The blowing agent is usually added during polymerization, however, it is also possible to add the blowing agent to the polystyrene particles in a subsequent processing step. Preferred blowing agents are $C_3$ to $C_6$ hydrocarbons, especially pentanes.

The polymerization of styrene generally occurs in the presence of chain transfer agents by which the optimum molecular weight can be adjusted. A preferred molecular weight regulator is dimeric α-methylstyrene.

Due to the synthesis process, industrial styrene which is used for the preparation of expandable polystyrene always contains contaminants on the order of magnitude of from about 100 to several thousand ppm, especially ethylbenzene and cumol. The same is true for dimeric α-methylstyrene which contains considerable quantities of alkylated aromatic substances as contaminants. Such hydrocarbons, on one hand, act as auxiliary blowing agents and improve the expandability of the styrene polymers, yet on the other hand they act as a plasticizer and cause undesirable shrinkage of the expanded particles, especially, if they do not diffuse out of the foam particles. Attempts have been made to influence these occurrences by adding certain hydrocarbons, however, no one has yet to succeed in preparing, in a reproducible fashion, expandable polystyrene having permanently good properties, especially a high degree of expansion, short demold times when preparing molded articles and good molded article surface quality.

The object of the invention was to realize these goals in a simple fashion.

This object is met if before, during or after the polymerization of the styrene containing contaminants in an aqueous suspension and in the presence of from 0.05 to 0.5 weight percent, based on the styrene, of dimeric α-methylstyrene containing contaminants one adds:

A. 2 to 8 weight percent, based on the styrene, of a $C_3$ to $C_6$ hydrocarbon having a boiling point below 70° C. as a blowing agent; and B. 0.01 to 0.7 weight percent, based on the styrene, of a saturated hydrocarbon having a boiling point between 70° and 170° C. as an auxiliary blowing agent, whereby one first reports the content of saturated hydrocarbons, having a boiling point between 70° and 170° C., contaminating the styrene and dimeric α-methylstyrene, and then enough auxiliary blowing agent B is added before, during or after the polymerization so that the total content of auxiliary blowing agent B in the suspension is from 0.1 to 0.8 weight percent, based on the styrene.

The expandable polystyrene is prepared by the polymerization of styrene along with from 0.05 to 0.5 weight percent, more preferably from 0.08 to 0.4 weight percent, based on the styrene, of industrial dimeric α-methylstyrene, in an aqueous suspension.

The suspension polymerization occurs in the presence of suspension stabilizers and typical styrene soluble polymerization catalysts. Suspension stabilizers here are commonly, along with molecular colloids, such as, polyvinyl alcohol (PVA) and polyvinyl pyrrolidone (PVP), difficultly soluble salts, such as, $Ca_3(PO_4)_2$ (so-called pickling salts) in combination with an extender, such as, dodecylbenzol sulfate.

Extenders are understood to be compounds which increase the ability of difficultly soluble inorganic compounds to stabilize suspensions. The extenders have a partial hydrophobic effect on the, essentially, hydrophilic inorganic pickling salt. This is accordingly forced desirably into the surface of the polymerizing styrene droplets.

In the polymerization, one of the typical radicle polymerization catalysts are added, for example, dibenzoylperoxide, tert.-butyl perbenzoal or dicumyl peroxide.

Per the invention, before, during or after the polymerization, one adds the following auxiliaries:

A. 2 to 8 weight percent, more preferably 3 to 5 weight percent of a $C_3$ to $C_6$ hydrocarbon having a boiling point below 70° C. as a blowing agent. Typical blowing agents are, for example, propane, butane, isobutane, n-pentane, isopentane, neopentane, cyclopentane and hexanes, as well as their mixtures. N-pentane is preferred.

B. 0.01 to 0.7 weight percent, more preferably 0.05 to 0.5 weight percent, based on the styrene, of a saturated hydrocarbon having a boiling point between 70° and 170° C., more preferably between 100° and 145° C. If the boiling point is very low, then the auxiliary—especially with low quantities—diffuses out too quickly from the expanding polystyrene beads and the desired high expansion ability is no longer achieved. If the boiling point is very high, then too much auxiliary blowing agent—especially with high quantities—remains in the foamed molded article and damages its properties. Suitable hydrocarbons are heptanes, octanes, nonanes, xylols, ethylbenzene, cumol, ethyltoluene, as well as mineral oils and petrol ethers. N-octane is a preferred auxiliary blowing agent.

Per the invention, efficaciously by analysis, the content of hydrocarbons having a boiling point between 70° and 170° C. contaminating the monomeric styrene and dimeric α-methylstyrene is reported, then the calculated quantity of auxiliary blowing agent is added to the optimum total content [level]. This optimum content depends on the type of containments and/or on the auxiliary blowing agent added, as well as on the desired properties (e.g., degree of expansion, foaming rate, demold times, surface quality). Generally, it lies between 0.01 and 0.8 weight percent, more preferably between 0.3 and 0.6 weight percent and most preferably between 0.35 and 0.5 weight percent, based on the styrene. The auxiliary blowing agent can be added to the styrene before beginning the polymerization, or during or after the polymerization with the blowing agent.

The styrene polymers can also contain conventional amounts of other substances which offer the expandable products certain properties. Typical examples are flame retardants based on organic bromo or chloro compounds, such as, tris(dibromopropyl) phosphate, hexabromocyclododecane, chloroparaffin, as well as synergists for flame retardants, such as, dicumyl and highly decomposable organic peroxides; also antistatic agents; stabilizers; dyes; lubricants; fillers and materials permitting anti-clumping during foaming, such as, zinc stearate, melamine formaldehyde condensates of silica gel; as well as agents for reducing demold times when foaming, such as, for example, glycerine ester, or hydroxycarboxylic acid ester. The additives, depending on their intended affect, can be homogeneously distributed in the particles, or be present as a surface coating.

Accordingly, the additives are added to the process of the invention, or subsequently applied to the expandable styrene polymers.

The bead shaped, expandable styrene polymers obtained per the process of the invention are separated from the aqueous phase after completing polymerization, washed and dried.

The styrene polymer particles containing blowing agent, obtained per the invention, generally have a diameter between 0.2 and 4 mm. Following conventional methods, e.g., with steam, they can be foamed into foam particles having a diameter between 0.1 and 2 cm and having a bulk density between 0.005 and 0.1 g/cm³.

The prefoamed particles can be foamed into molded foam articles having a density of from 0.005 to 0.1 g/cm³ using conventional processes.

The expandable polystyrene beads prepared per the invention are characterized by a good processing constancy, namely by a uniformly high degree of expansion, by uniformly high foaming rates, as well as by uniformly low demold times when preparing molded articles. In addition, the tendency to clump during the prefoaming process is low, and the resulting foam molded articles are characterized by uniform good surface quality.

EXAMPLES

Added to a pressure tight, 50 liter agitated vessel, made of rust free steel, was a mixture of 19.5 kg of completely deionized water, 19.5 grams $Na_4P_2O_7$ and 52.7 grams $MgSO_4$. Also added were 17 kg of styrene, 17 grams of dibenzoylperoxide, 51 grams of dicumylperoxide, as well as the amounts of dimeric α-methylstyrene (DMS) and n-octane cited in the Table. The quantities of n-octane were each adjusted to the degree of purity of the batch used. The mixture was heated from 25° C. to 100° C. within 2 hours, and subsequently heated from 100° C. to 130° C. within 5 hours. The mixture was kept at 130° C. for an additional 3 hours. 478 grams of a 10 weight percent aqueous polyvinyl pyrrolidone solution (K value: 90) was added to the mixture 55 minutes after achieving a temperature of 80° C., and following another 125 minutes, 0.68 kg of n-pentane (4 percent based on styrene) was added. The resulting beads were centrifuged off, dried with cold air, and coated with 0.1 weight percent, based on the weight of the uncoated beads, of ethylene bis-stearic acid amide.

Thereafter, the bead size fraction of from 0.70 to 1.00 mm was sifted out, and coated with 0.5 weight percent, based on the beads' weight, of a mixture comprising 40 weight percent of citric acid tri-stearyl ester, 50 weight percent of glycerine monostearate and 10 weight percent of silica gel FK 320 (Goldschmidt Company).

Prefoaming occurred 10 minutes in a pressureless foaming box (Rauscher system) using flowing steam. The free densities obtained are found in the Table.

From the Table, one learns that the bulk densities of the resulting foam particles (i.e., the degree of expansion) were kept constant by the selected addition of the auxiliary blowing agent n-octane.

TABLE

| Example | Styrene Purity in % | Contaminants having a boiling point 70°–170° C. in ppm | DMS Quantity in ppm | Contaminants having a boiling point 70°–170° C. in ppm | N-octane added in ppm | Bulk Density g · l⁻¹ |
| --- | --- | --- | --- | --- | --- | --- |
| 1 | 99.99 | 100 | 2800 x | 1000 | 3000 | 21.0 |
| 2 | 99.7 | 3000 | 2800 x | 1000 | 100 | 20.7 |
| 3 | 99.99 | 100 | 2000 xx | 200 | 3800 | 21.0 |
| 4 | 99.7 | 3000 | 2000 xx | 200 | 900 | 20.4 | x DMS about 65% pure
xx DMS about 90% pure

We claim:

1. A process for the preparation of bead shaped, expandable polystyrene by the polymerization of styrene containing contaminants in an aqueous suspension in the presence of suspension stabilizers and ordinary styrene soluble polymerization catalysts and from 0.05 to 0.5 weight percent, based on the styrene, of dimeric α-methylstyrene containing contaminants, whereby:

A. 2 to 8 weight percent, based on the styrene, of a $C_3$ to $C_6$ hydrocarbon having a boiling point below 70° C. as a blowing agent; and B. 0.01 to 0.7 weight percent, based on the styrene, of a saturated hydrocarbon having a boiling point between 70° and 170° C. as an auxiliary blowing agent, are added to the aqueous suspension before, during or after polymerization wherein one first reports the content of saturated hydrocarbons, having a boiling point between 70° and 170° C., contaminating the styrene and dimeric α-methylstyrene, and then enough auxiliary blowing agent B is added before, during or after the polymerization so that the total content of auxiliary blowing agent B in the suspension is from 0.1 to 0.8 weight percent, based on the styrene.

* * * * *